United States Patent [19]

Yokoi et al.

[11] 4,411,174

[45] Oct. 25, 1983

[54] TRANSMISSION SHIFT CONTROL DEVICE

[75] Inventors: Takeshi Yokoi; Noritaka Yanagihara, both of Toyota, Japan

[73] Assignee: Toyota Jidosha Kogyo Kabushiki Kaisha, Japan

[21] Appl. No.: 258,031

[22] Filed: Apr. 27, 1981

Related U.S. Application Data

[63] Continuation of Ser. No. 46,171, Jun. 7, 1978, abandoned.

[30] Foreign Application Priority Data

Aug. 30, 1978 [JP] Japan ............................... 53-105826

[51] Int. Cl.³ ............................................ B60K 41/04
[52] U.S. Cl. ....................................... 74/866; 74/861; 74/865; 74/878
[58] Field of Search ................. 74/843, 856, 861, 863, 74/879, 878, 866, 865; 364/424.1

[56] References Cited

U.S. PATENT DOCUMENTS

| | | | |
|---|---|---|---|
| 3,680,410 | 8/1972 | Sumiyoshi | 74/866 |
| 3,684,066 | 8/1972 | Kubo et al. | 74/866 X |
| 3,688,609 | 9/1972 | Friedline | 74/866 |
| 3,805,640 | 4/1974 | Schneider et al. | 74/733 |
| 3,922,933 | 12/1975 | Sakai et al. | 74/866 |
| 4,023,442 | 5/1977 | Woods et al. | 74/863 |
| 4,027,554 | 6/1977 | Ito et al. | 74/866 |
| 4,061,055 | 12/1977 | Iizuka et al. | 74/866 |
| 4,102,222 | 7/1978 | Miller et al. | 74/866 |
| 4,109,772 | 8/1978 | Poore | 74/861 X |
| 4,269,281 | 5/1981 | Schneider et al. | 74/866 |

FOREIGN PATENT DOCUMENTS

| | | | |
|---|---|---|---|
| 2338122 | 2/1975 | Fed. Rep. of Germany | 74/866 |
| 2625770 | 12/1977 | Fed. Rep. of Germany | 74/861 |
| 2748227 | 6/1978 | Fed. Rep. of Germany | 74/863 |
| 2271461 | 12/1975 | France | 74/861 |
| 2315641 | 1/1977 | France | 74/866 |
| 1439675 | 6/1976 | United Kingdom | 364/424.1 |

Primary Examiner—Leslie A. Braun
Assistant Examiner—Lawrence J. Gotts
Attorney, Agent, or Firm—Finnegan, Henderson, Farabow, Garrett & Dunner

[57] ABSTRACT

In order to control shifting of the transmission of a vehicle, from the viewpoint of obtaining the optimum fuel economy and/or power output performance, a transmission shift control device is proposed which comprises a throttle sensor which generates a throttle signal, an engine speed sensor which generates an engine speed signal, a shift position sensor which generates a shift position signal indicating the present operating gear of the transmission, a memory which stores a relationship between the throttle opening and the engine speed for each shift position or operating gear of the transmission to give a target value for one of these two signals in accordance with the other of them, and a comparator which receives one of the above two signals and compares it with the target value therefor given from the memory and generates either an upshift signal or a downshift signal which is indicated to the driver or sent to the transmission so as automatically to shift it.

12 Claims, 15 Drawing Figures

F I G. 13
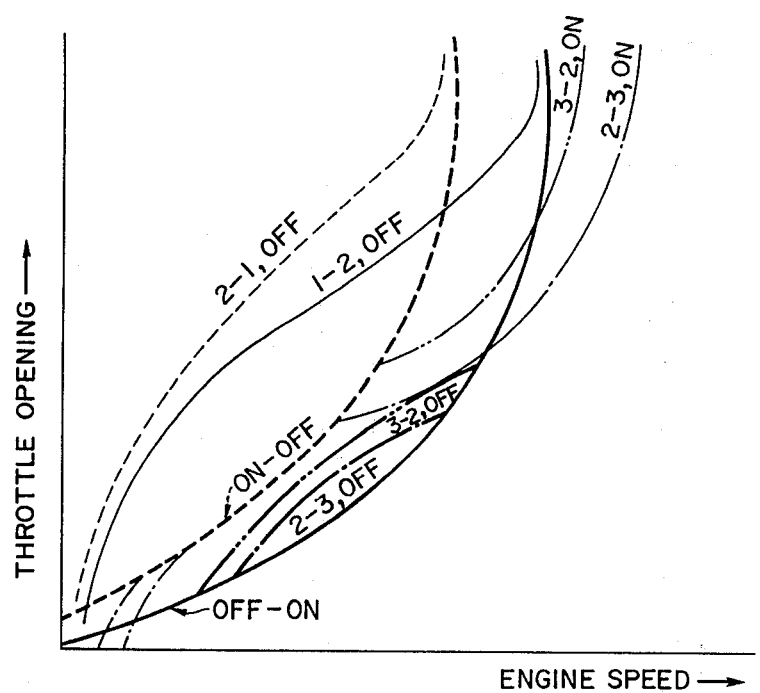

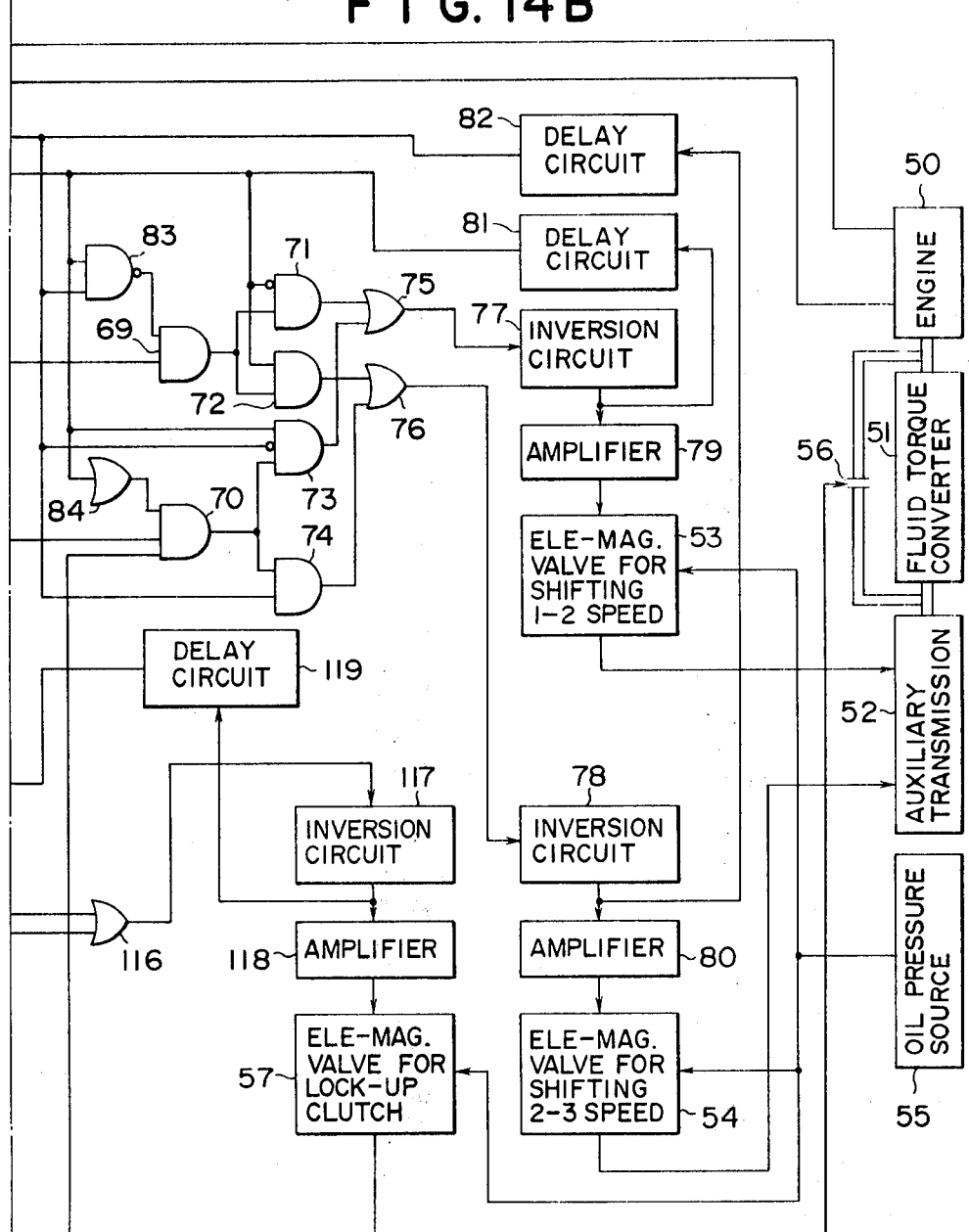

TRANSMISSION SHIFT CONTROL DEVICE

This is a continuation of application Ser. No. 046,171, filed June 7, 1979 now abandoned.

BACKGROUND OF THE INVENTION

The present invention relates to a device for controlling the transmission of a vehicle, and, more particularly, to a device for controlling the shift timing of the transmission of a vehicle in accordance with the operating conditions of the engine and the vehicle, from the standpoint of maximizing fuel economy and power output performance.

In a vehicle equipped with a manual transmission and a mechanical clutch, the fuel economy is generally expressed by the following formula:

$$Ef = Sv \times wf \times et \times 1000/(fb \times Nr) \tag{1}$$

where:
Ef is the fuel economy, in km/liter;
Sv is the vehicle speed, in km/hour;
wf is the specific gravity of the fuel, in g/cm³;
et is the mechanical efficiency of the gear train;
fb is the brake specific fuel consumption, in g/PS.hour; and
Nr is the required power, in PS.

In order to maximize the fuel economy, under the condition that the vehicle speed Sv and the required power Nr are constant, it is necessary to minimize the value fb/(wf×et). In this case, since the specific gravity of the fuel wf and the mechanical efficiency of the geartrain et can be taken as being substantially constant, regardless of the operating conditions of the engine, it is necessary to minimize the specific fuel consumption fb, in order to maximize the fuel economy.

Substituting the fuel consumption F (in liters/hour) for the brake specific fuel consumption fb, the above is simplified as follows:

$$Ef = Sv/F \tag{2}$$

Under the condition that the required power Nr is constant, the fuel consumption F is proportional to the brake specific fuel consumption fb, and therefore the condition for minimizing the fuel consumption F can be substituted for the condition for minimizing the brake specific fuel consumption fb. Now, because the brake specific fuel consumption fb varies in relation to engine speed and engine torque, better fuel consumption will be achieved if engine speed is controlled while maintaining the required power. The optimum condition for this control is given by a performance line in a graph taking engine torque and the engine speed as variables. Hereinafter this performance line is referred to as the maximum fuel economy operation line. In order to change engine speed under the condition that the vehicle speed Sv and the required power Nr are maintained at constant values, it is necessary to change transmission ratio, namely to shift the transmission. Therefore, with regard to the transmission there exists the optimum shift point which enables the engine to operate at the required performance, and if shifting of the transmission is performed at this point, the engine comes to be operated along the abovementioned maximum fuel economy operation line, thereby accomplishing high fuel economy.

In the case of a vehicle equipped with an automatic transmission including a fluid torque converter, the equation for the fuel economy of the vehicle is, in consideration of the torque converter efficiency ec, modified as follows:

$$Ef = Sv \times wf \times ec \times et \times 1000/(fb \times Nr) \tag{3}$$

The torque converter efficiency ec varies, as is well known, in accordance with the transmission ratio e (e=turbine shaft speed/pump shaft speed). Contour lines of various required powers Nr (equi-Nr lines), which are drawn on the graph which takes engine torque and engine speed as variables, are different from those of a manual transmission, especially in the low engine speed range, and therefore the maximum fuel economy operation line of the vehicle differs from that of a vehicle equipped with a manual transmission.

The maximum fuel economy operation line of a vehicle equipped with an automatic transmission including a fluid torque converter has not been heretofore clarified. However, we have found this as a result of experimental researches. Namely, it has been found that, in the high engine speed range, the maximum fuel economy operation line of a vehicle equipped with an automatic transmission is approximately the same as that of a vehicle equipped with a manual transmission, while in the low engine speed range, the line of the vehicle having an automatic transmission extends along the speed ratio curve which maximizes the converter efficiency ec.

SUMMARY OF THE INVENTION

A main object of the present invention is to provide a device which indicates the optimum shift timing to the driver or controls a shifting system of the transmission, in accordance with the optimum shift timing, so that the engine is operated as much along the abovementioned maximum fuel economy operation line as possible.

Another object of the present invention is to indicate shift timing for changing over a sub-transmission between the high speed stage and the low speed stage or to perform automatically the changing over of the sub-transmission between the high speed stage and the low speed stage, in order to obtain the optimum operating condition for a manual transmission equipped with a sub-transmission.

Still another object of the present invention is automatically to change over the auxiliary transmission of an automatic transmission of the type having a fluid torque converter and an auxiliary transmission (gear train), in accordance with the optimum operating condition, which has been found by us through experimental researches with regard to automatic transmissions of the aforementioned type.

Still another object of the invention is to provide a device which indicates the optimum shift timing to the driver or controls a shifting system of the transmission in accordance with the optimum shift timing, so that the engine is operated along the maximum fuel economy operation line in a relatively low engine speed range or a small throttle opening range, and along the maximum output power operation line in a relatively high engine speed range or a large throttle range.

According to the present invention, the abovementioned objects are achieved by a transmission shift control device for a transmission of a vehicle incorporating an internal combustion engine having an intake system, comprising: a throttle sensor which detects a value representing throttle opening of the engine intake system and generates an actual throttle signal; an engine speed sensor which detects a value representing engine rotational speed and generates an actual engine speed signal; a memory which stores a relation between the throttle opening and the engine speed and gives a target value for one of the throttle signal and the engine speed signal in accordance with the actual value of the other of these two signals; and a comparator which receives the actual value of said one of the throttle signal and the engine speed signal, compares this actual value with the target value therefor given from said memory, and provides either an upshift signal or a downshift signal.

According to a particular aspect of the present invention, the relation between the throttle opening and the engine speed, which is stored in the memory, may be the relation between these two factors which provides the maximum fuel economy.

According to another particular aspect of the present invention, the relation between the throttle opening and the engine speed, which is stored in the memory, may be the relation of those two factors which provides the maximum fuel economy when the engine speed and/or the throttle opening is smaller than a predetermined value, and the maximum output power when the engine speed and/or the throttle opening is greater than a predetermined value.

According to still another aspect of the present invention, the memory may be adapted to give target values for the throttle opening in accordance with the engine speed, and the comparator may be adapted to receive the throttle signal Treal generated by the throttle sensor, to compare it with the target value for the throttle opening Ttar given from the memory, and to generate an upshift signal when Treal is smaller than Ttar, while it generates a downshift signal when Treal is greater than Ttar.

In this case, as a variant, the memory may store an upper limit value Thi and a lower limit value Tlow of the target values for the throttle opening required for obtaining the optimum operation, and the comparator may include a comparator for upshifting, which compares the throttle signal Treal with the lower limit value Tlow, and a comparator for downshifting, which compares the throttle signal Treal with the upper limit value Thi, wherein the upshift comparator is adapted to generate an upshift command when Treal is smaller than Tlow, and the downshift comparator is adapted to generate a downshift signal when Treal is greater than Thi.

Furthermore, according to still another aspect of the present invention, the memory may be adapted to give target values for the engine speed in accordance with the throttle opening, and the comparator may be adapted to receive the engine speed signal Nreal generated by the engine speed sensor, to compare it with the target value for the engine speed Ntar given from the memory, and to generate a downshift signal when Nreal is smaller than Ntar, while it generates an upshift signal when Nreal is greater than Ntar.

In this case, as a variant, the memory may store an upper limit value Nhi and a lower limit value Nlow of the target values for the engine speed required for obtaining optimum operation, and the comparator may include a comparator for upshifting, which compares the engine speed signal Nreal with the upper limit value Nhi, and a comparator for downshifting, which compares the engine speed signal Nreal with the lower limit value Nlow, wherein the upshift comparator is adapted to generate an upshift signal when Nreal is greater than Nhi, and the downshift comparator is adapted to generate a downshift signal when Nreal is smaller than Nlow.

BRIEF DESCRIPTION OF THE DRAWINGS

The present invention will become more clear from the following description of several preferred embodiments thereof, taken in conjunction with the accompanying drawings. It should be clearly understood, however, that the present invention is not to be limited by any features of the embodiments described, or of the drawings, which are given for illustrative purposes only. In the drawings:

FIG. 13 is a graph showing changeover lines for a directly coupled clutch and an optimum upshift line and an optimum downshift line for an auxiliary transmission of an automatic transmission with a directly coupled clutch.

DESCRIPTION OF THE PREFERRED EMBODIMENTS

Figure 1:
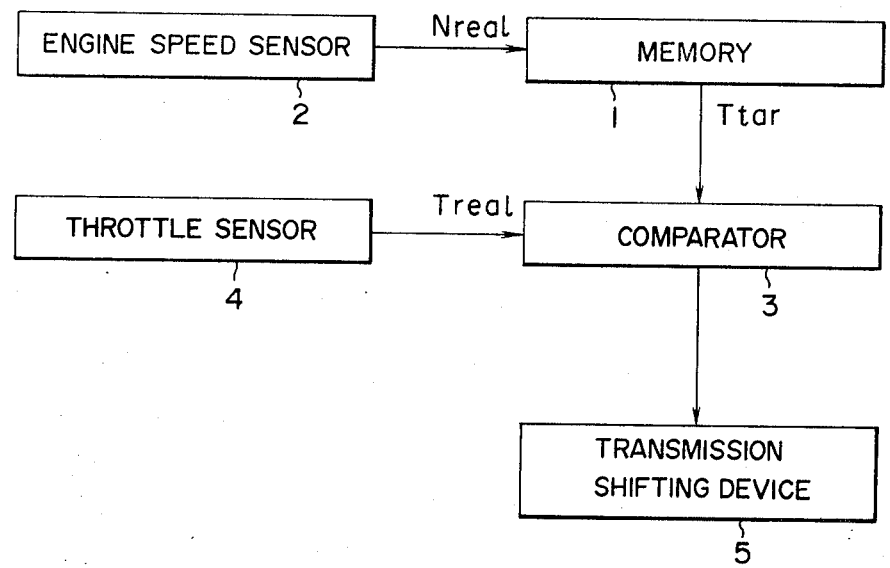
FIG. 1 and FIG. 2 are block diagrams, each showing the basic arrangement of an embodiment of the transmission shift control device in accordance with the present invention.

Referring to FIG. 1, herein is shown a basic constitution of the transmission shift control device of the present invention, in which the optimum throttle opening (i.e., the target throttle opening) corresponding to various possible values of engine speed is stored in a memory 1, and is compared with the actual throttle opening in order to generate a command for the transmission. In this figure, the memory 1, which may be a read-only memory (hereinafter abbreviated to ROM), stores beforehand various optimum throttle opening values corresponding to various engine speeds, that is, the target values Ttar. This memory 1 is adapted to receive the actual engine speed signal Nreal from an engine speed sensor 2 as addressing information, and to give the stored information in the addressed memory location, namely the target value of throttle opening Ttar, to a comparator 3. The comparator 3 is adapted to compare the real value of throttle signal Treal supplied from a throttle sensor 4 with the target value Ttar supplied from the memory 1, thereby generating an upshift command signal to a transmission shift control device 5 when Ttar is greater than Treal, while generating a downshift command signal to the transmission shift control device 5 when Ttar is less than Treal. The throttle sensor 4 is adapted to detect a value representing the throttle opening of the engine intake system, for example, the opening of the throttle valve, or the vacuum in the intake passage, and generates an electrical throttle signal. If the transmission is a manual transmission equipped with a sub-transmission, the transmission shift control device is adapted to control energization of an actuator which changes over the sub-transmission, and if the transmission is an automatic transmission including a fluid torque converter such as an auxiliary transmission, the transmission shift control device 5 is adapted to control energization of an electromagnetic valve which changes over the auxiliary transmission. Further, if the transmission timing is displayed to the driver, this transmission shift control device 5 is adapted to perform energization of an indicator, such as an upshift or downshift indicating lamp on an instrument panel visible from the driver's seat.

Figure 2:
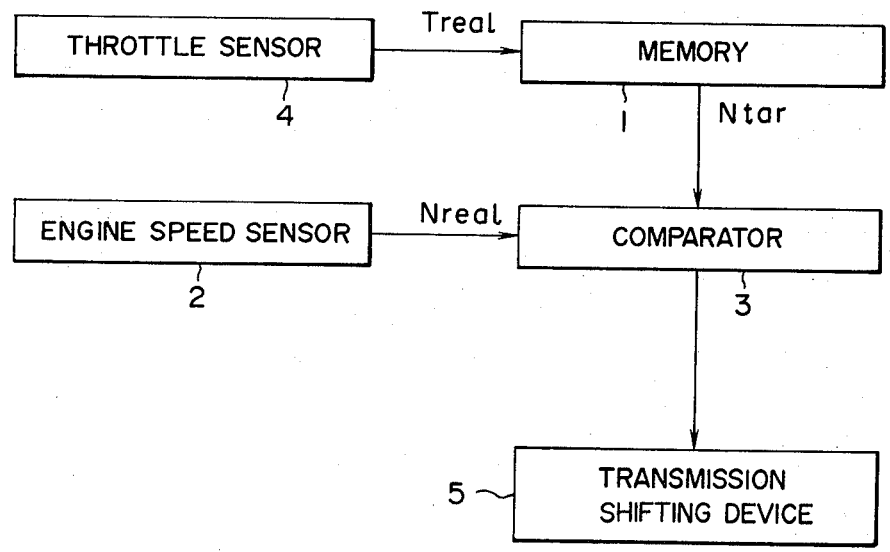

FIG. 2 shows a basic constitution of the transmission shift control device in which the optimum engine speeds (i.e., the target values of engine speed corresponding to various throttle openings), are stored in a memory, and are compared with the actual engine speeds in order to generate a transmission shift signal. In FIG. 2, the parts corresponding to those shown in FIG. 1 bear the same reference numbers. In this case, the memory 1 is adapted to store the optimum engine speeds corresponding to various throttle openings, namely target values Ntar, and to receive the actual value of throttle opening signal Treal from the throttle sensor 4 as addressing information. The memory 1 is adapted to dispatch the information stored in the addressed location, namely the target value of the engine speed Ntar corresponnding to the actual throttle opening, to the comparator 3. This comparator 3 is adapted to compare the actual value of engine speed Nreal given from the engine speed sensor 2 with the target value Ntar given from the memory 1, and generates an upshift signal to the transmission shift control device 5 when Ntar is less than Nreal, while generating a downshift signal to the transmission shift control device when Ntar is greater than Nreal.

Figure 3:
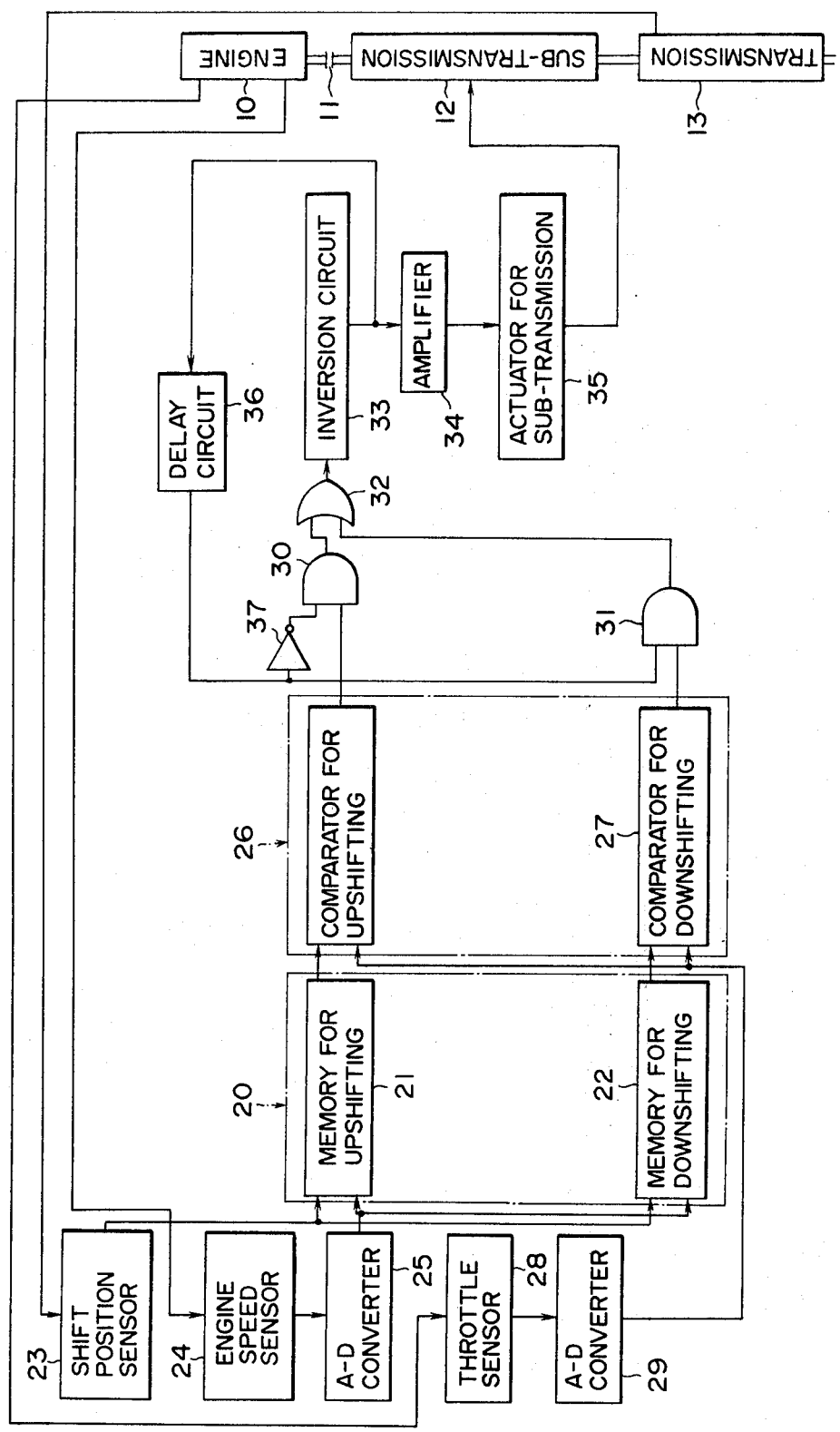
FIG. 3 is a block diagram or diagrammatic view showing an embodiment of the present invention, which is adapted to perform automatically changing over of a sub-transmission of a manual transmission by means of the transmission shift control device of the present invention.

FIG. 3 is a diagrammatical view showing a more concrete embodiment of the present invention, which is adapted to perform automatically the changing over of a sub-transmission of a manual transmission by means of the transmission shift control device of the present invention. In this figure, reference number 10 denotes the engine of the vehicle, and the rotary power taken from the crankshaft of the engine 10 is transmitted by way of a mechanical clutch 11 to a sub-transmission 12, and then is transmitted to a transmission 13, which in the present embodiment is a manually operated transmission, and then is transmitted from the output shaft of the transmission 13 to the axle of the vehicle, not shown in the drawing. The sub-transmission 12 may comprise a two-stage transmission gear system, which is per se known in the art, and the transmission 13 may be a normal four-stage gear transmission. Therefore, in all, by the combination of the operation of this transmission and this sub-transmission, eight ($8 = 2 \times 4$) gearing ratios may be provided.

The memory 20 of the transmission shift control device includes a memory 21 for upshifting and a memory 22 for downshifting. The memory 21 for upshifting stores various lower limit values Tlow of the target value for the optimum throttle opening corresponding to various engine speeds, and the memory 22 for downshifting stores various upper limit values Thi of the target value for the optimum throttle opening corresponding to various engine speeds.

Figure 4:
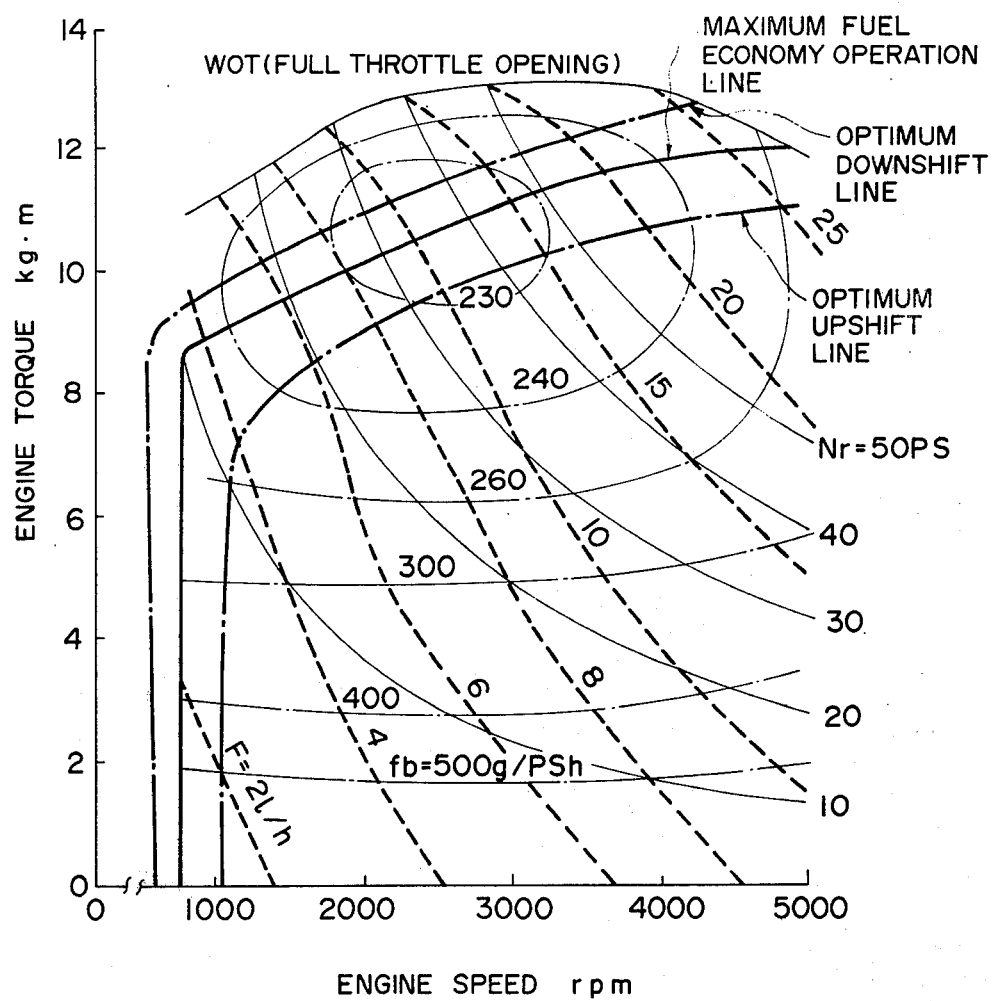
FIG. 4 is a graph showing a maximum fuel economy operating line, lines of equal required output power Nr, and so on, of a vehicle equipped with a manual transmission.

Herein, the optimum throttle opening, which should be stored in the memory 21 for upshifting and the memory 22 for downshifting, will be explained with reference to FIGS. 4, 5, and 6. FIG. 4 is a graph, in which engine speed and engine torque are taken respectively along the abscissa and the ordinate, showing a maximum fuel economy operating line, lines of equal required output power Nr, and so on, of a vehicle equipped with a manual transmission. In this graph, the thick solid line is the line of maximum fuel economy operation, the two thick chain lines are the lines of optimum upshift and downshift, the fine solid lines are lines of equal required output power Nr, the thick broken lines are lines of equal fuel consumption F, and the fine chain lines are lines of equal brake specific fuel consumption fb. The maximum fuel economy line is a line drawn by plotting points at which the fuel consumption F for obtaining various required output power Nr is the smallest, and the optimum upshift and downshift lines are drawn along and on opposite sides of said maximum fuel economy operating line, so as to indicate that, if the engine is operated in the range defined by these two lines of optimum upshift and downshift, the engine exhibits its best fuel economy.

Figure 5:
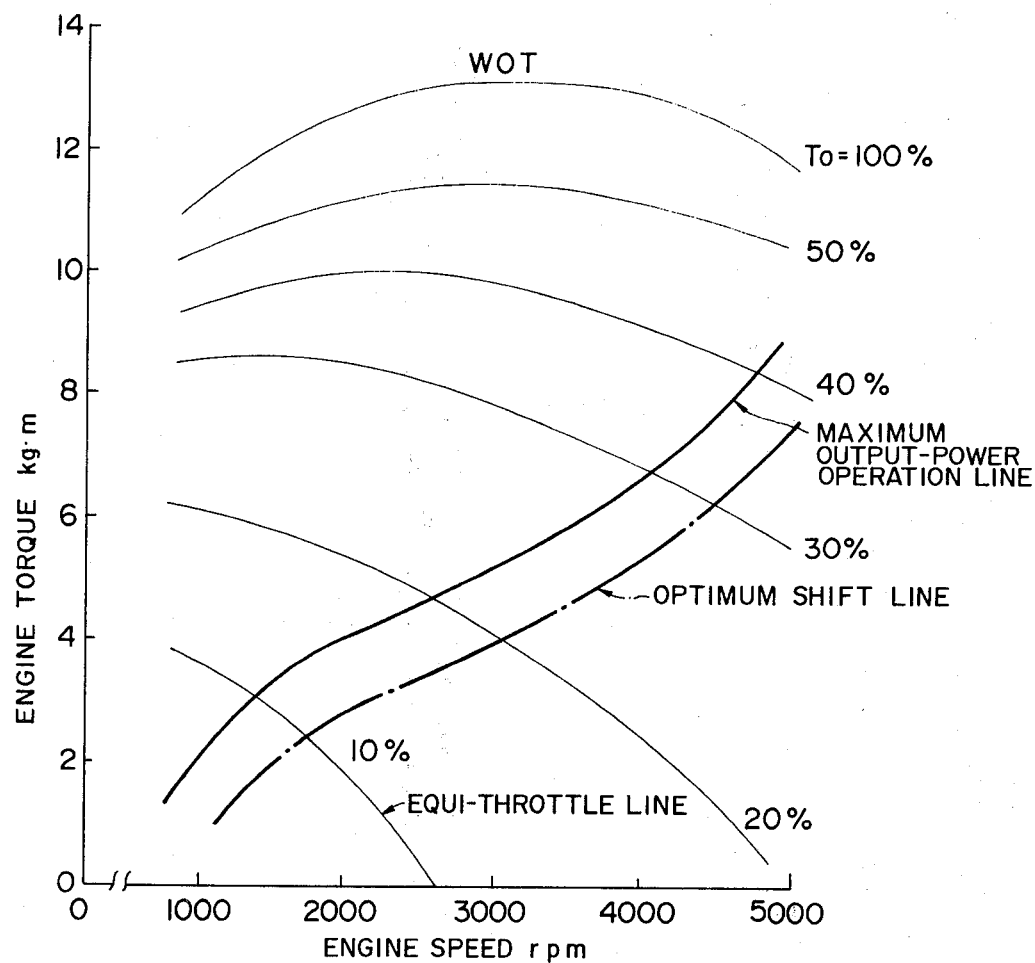
FIG. 5 is a graph showing a maximum required output power operating line, an optimum upshift line, and so on, of a vehicle equipped with a manual transmission.

FIG. 5 is a graph, in which engine speed and engine torque are taken respectively along the abscissa and the ordinate, showing a line of maximum operating power, an optimum upshift line, and lines of equal throttle opening for a manual transmission. In this graph, the thick solid line is the line of maximum operating power, the thick chain line is the optimum upshift line in consideration of the power performance of the engine, and the fine solid lines are lines of equal throttle opening. If the engine is operated along its maximum operating power line, it exhibits its best power performance.

Figure 6:
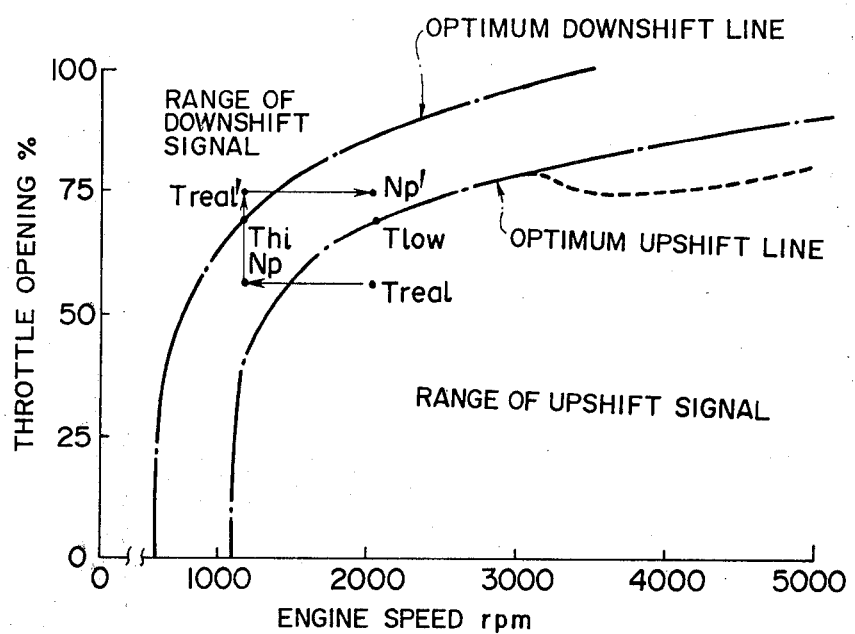
FIG. 6 is a graph showing an optimum upshift line and an optimum downshift line of a vehicle equipped with a manual transmission.

FIG. 6 is a graph, in which engine speed and throttle opening in percent are taken respectively along the abscissa and the ordinate, which shows an optimum upshift line and an optimum downshift line for a manual transmission. The right hand one-dot chain line as a whole is the line of optimum upshift in the case that shift changing of the transmission is to be performed with a view to maximizing the fuel economy of the vehicle over the whole range of engine speed, while the line of optimum upshift, in the case that shift changing of the transmission is to be performed with a view to maximizing the fuel economy over the range of relatively low engine speed, and with a view to maximizing the operating power over the range of relatively high engine speed and relatively large throttle opening, is to be found by the combination of the left hand part of the right hand one-dot chain line and the broken line. The line of optimum downshift is the left hand chain line. It should be noted that these optimum upshift and downshift lines may vary somewhat according to the ratios of the transmission stages of the transmission, and FIG. 6 shows those of the third gear stage as an example.

The upshift memory 21 is adapted to store a relation between the throttle opening and the engine speed along the optimum upshift line as shown in FIG. 6 with respect to every transmission stage, and to give the lower limit of the target value for the optimum throttle opening, Tlow, according to the engine speed. And, further, the downshift memory 22 is adapted to store a relation between the throttle opening and the engine speed along the optimum downshift line as shown in FIG. 6 with respect to every transmission stage, and to give the upper limit of the target value for the optimum throttle opening Thi according to the engine speed. The upshift and downshift memories 21 and 22 are adapted to receive a shift position signal generated by a shift position sensor 23, and an engine speed signal generated by the engine speed sensor 24 and converted to a digital signal by an A-D converter 25, and depending upon these signals the memory 21 gives the lower limit of the target value, Tlow, to a comparator 26 for upshifting, while the memory 22 gives the upper limit of the target value, Thi, to a comparator 27 for downshifting. These comparators receive also a throttle signal generated by a throttle sensor 28 and converted to a digital signal by an A-D converter 29. The comparator 26 for upshift is adapted to compare the throttle signal, i.e. Treal, with the lower limit of the target value, Tlow, and generates a "1" signal when Treal is less than Tlow, and a "0" signal when Treal is greater than Tlow. The comparator 27 for downshift is adapted to compare the value of the throttle signal, Treal, with the upper limit of the target value, Thi, and generates a "1" signal when Treal is greater than Thi, while generating a "0" signal when Treal is less than Thi. These comparators may be of a well known type, which includes an operational amplifier. It should also be understood that the "1" output signal is the potential of a positive source, while the "0" signal is ground potential.

The output signal of the comparator 26 for upshifting is supplied to one of the input terminals of a first AND gate 30, and the output signal of the comparator 27 for downshifting is supplied to one of the input terminals of a second AND gate 31. The output signals of the first and second AND gates 30 and 31 are supplied together to an OR gate 32, the output signal of which is supplied to an inversion circuit 33. This inversion circuit 33 is, for example, a trigger FLIP-FLOP circuit, and is inverted from the set state to the reset state or from the reset state to the set state, every time a "1" signal is supplied to its input terminal. In other words, if the inversion circuit receives a "1" signal at its input terminal, its output signal is inverted to "0" If it has been "1", and is inverted to "1" if it has been "0". The output signal of this inversion circuit 33 is supplied to an amplifier 34, so as to be amplified therein, and then the amplified signal is supplied to an actuator 35 which changes over the sub-transmission. The actuator 35 is, for example, a solenoid device which changes over the sub-transmission 12 to its high speed stage when a "1" signal is given to the solenoid device, namely when the solenoid is energized, while it changes over the sub-transmission 12 to its low speed stage when a "0" signal is given to the solenoid device, namely when the solenoid is de-energized. The output signal of the inversion circuit 33 is also supplied to a NOT gate 37 and the second AND gate 31 by way of a delay circuit 36. The output signal of the NOT gate 37 is supplied to the first AND gate 30.

The delay circuit 36 is adapted to produce a time delay corresponding to the time which lapses from the moment of changing over of the inversion circuit 33 to the moment when the sub-transmission 12 is actually changed over. Let it be assumed that, in operation of the vehicle, the sub-transmission 12 is in its low speed stage, namely the inversion circuit 33 is generating a "0" signal. In this case, according to the shift position of the transmission 13 and the engine speed, the memory 21 for upshifting provides a value as lower limit of the target value Tlow to the comparator 26 for upshifting, and the memory 22 for downshifting provides a value as the upper limit of the target value Thi to the comparator 27 for downshifting. If the real value of the throttle signal Treal, which is given from the throttle sensor 28 to the comparators 26 and 27, is smaller than the value of the lower limit of the target value Tlow, the comparator 26 generates a "1" signal. When Treal is smaller than Tlow, then Treal is of course smaller than Thi, so that the comparator 27 for downshifting remains in the state of generating a "0" signal. Now, under the condition that the inversion circuit 33 is generating a "0" signal as mentioned above, namely the sub-transmission 12 is in its low speed stage, even when a "1" signal has been given from the comparator 27 for downshifting to the second AND gate 31, this gate still remains in the state of generating a "0" signal, because the other input terminal of the gate 31 is receiving a "0" signal. On the other hand, when a "1" signal is given from the comparator 26 for upshifting to the first AND gate 30, this gate generates a "1" signal to the OR gate 32, because at this time the NOT gate 37 is receiving a "0" signal. As a result, the OR gate 32 provides a "1" signal to the inversion circuit 33. When the inversion circuit 33 receives the "1" signal, it comes to provide a "1" signal to the amplifier 34, resulting in the energization of the actuator 35, so that the sub-transmission is changed over to its high speed stage. When the sub-transmission 12 has been changed over from its low speed stage to its high speed stage, the engine now operates at a speed lower than that before the shifting, owing to the decrease of the speed reduction ratio, for example at the speed shown by Np in FIG. 6. As a result, the engine operates more economically than before the shifting.

Now, when the accelerator pedal is stepped on in the abovementioned economically operating state, so that the throttle opening reaches a value Treal' larger than the upper limit of the target value Thi corresponding to the engine speed Np, the comparator 27 for downshifting starts generating a "1" signal to the second AND gate 31. Since at this time the inversion circuit 33 is generating a "1" signal, the other input terminal of the second AND gate 31 is receiving a "1" signal, and therefore this AND gate 31 provides a "1" signal to the OR gate 32. Then, the OR gate 32 again provides a "1" signal to the inversion circuit 33. When the "1" signal is supplied to the inversion circuit 33, the inversion circuit 33 now generates a "0" signal to the amplifier 34. As a result, the actuator 35 is de-energized, and the sub-transmission 12 is changed over from its high speed stage to its low speed stage. Then, the engine comes to operate at a speed higher than that before the shifting, owing to the increase of the reduction ratio, for example, at the speed shown by Np' in FIG. 6, so that the engine again operates in an economical fashion.

Figure 7:
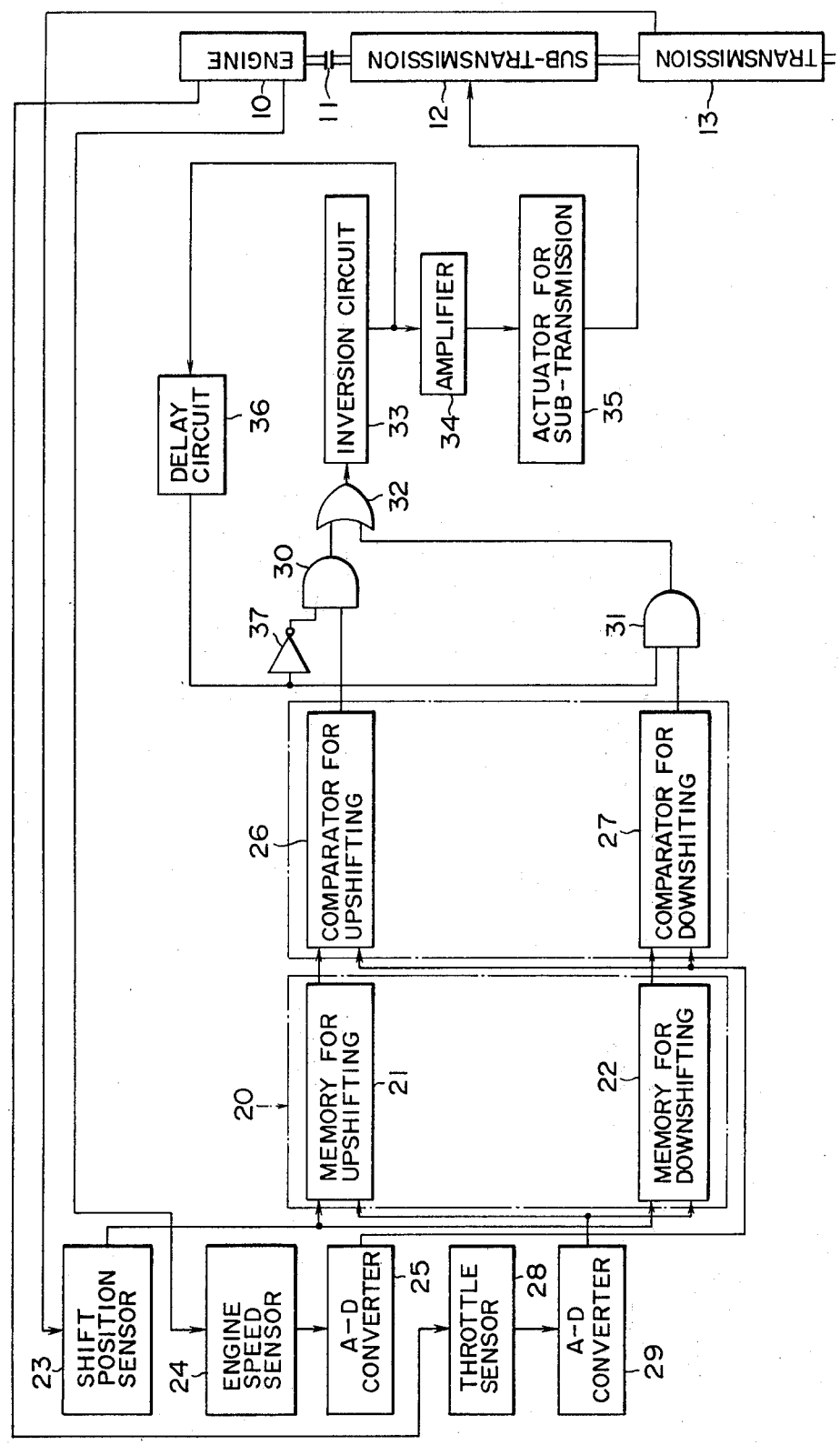
FIG. 7 is a diagrammatic view showing a modification of the embodiment shown in FIG. 3.

FIG. 7 shows a modification of the embodiment shown in FIG. 3. By contrast to the memory 20 in the embodiment shown in FIG. 3 which stores the upper and the lower limit values of the optimum throttle opening corresponding to various engine speeds, the memory 20 in the embodiment shown in FIG. 7 stores the upper and lower limit values of the optimum engine speed corresponding to various throttle openings. In more detail, the memory 21 for upshifting stores values of the upper limit of the target value Nhi for the optimum engine speed, and the memory 22 for downshifting stores values of the lower limit of the target value Nlow for the optimum engine speed. The memories 21 and 22 are adapted to receive the throttle signal generated by the throttle sensor 28 as addressing information and to provide the information stored in the addressed location, namely the values Nhi and Nlow, to the comparator 26 for upshifiting and the comparator 27 for downshifting, respectively. These comparators are adapted to receive the engine speed signal generated by the engine speed sensor 24 by way of the A/D converter, and to compare it with the target values given from the memories 21 and 22. In this case, the comparator 26 for upshifting is adapted to generate an upshift signal when Nreal is greater than Nhi, while the comparator 27 for downshifting is adapted to generate a downshift signal when Nreal is less than Nlow. The upshift signal generated by the comparator 26 for upshifting and the downshift signal generated by the comparator 27 for downshifting may be processed hereafter in a manner similar to that in the embodiment shown in FIG. 3, and therefore, detailed description will be omitted.

Figure 8:
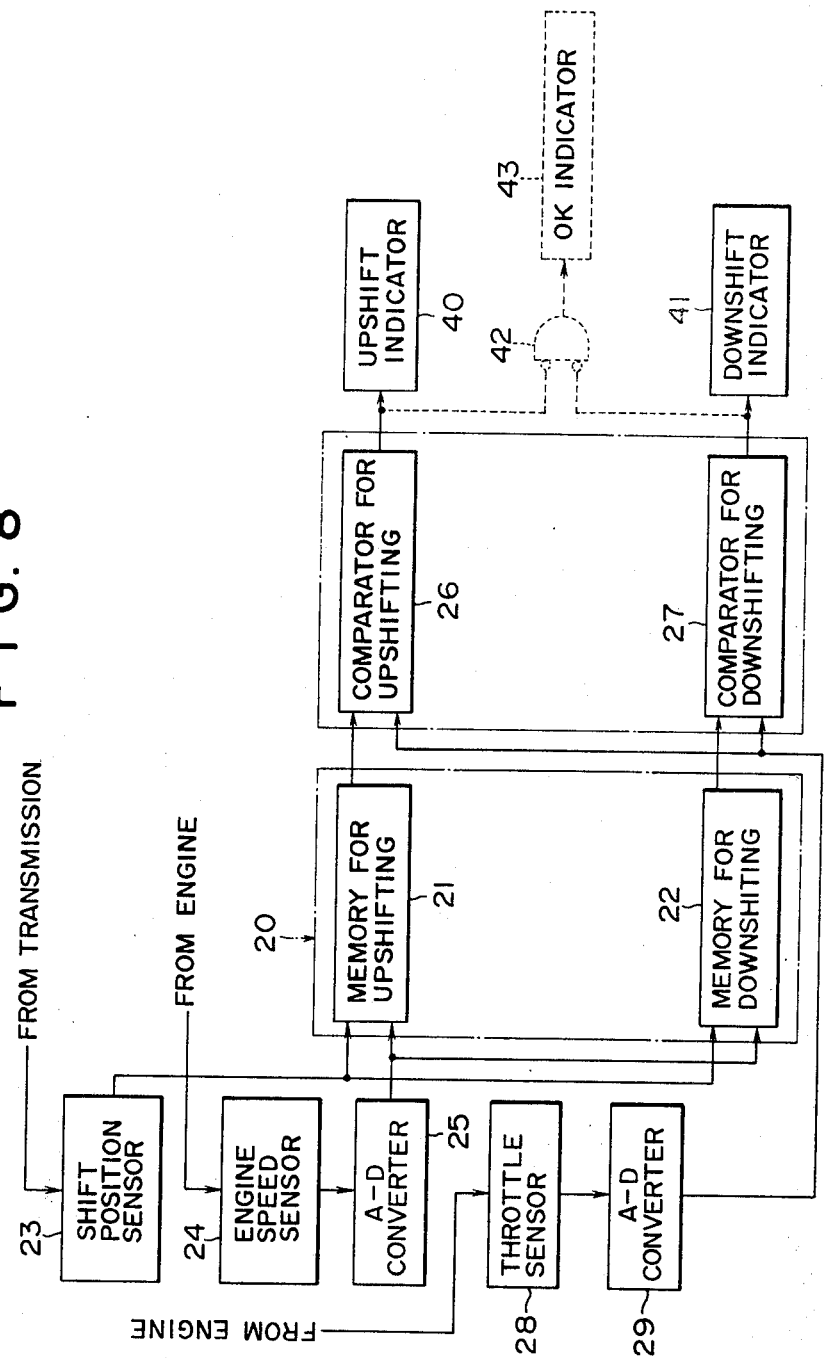
FIG. 8 is a block diagram showing an embodiment of the present invention, which is adapted to display the optimum transmission shift timing for a manual transmission or for a sub-transmission of a manual transmission to the vehicle driver on a shift indicator.

FIG. 8 is a block diagram showing an embodiment of the transmission shift control device in accordance with the present invention, which is adapted to display the optimum shift timing for a manual transmision or for a transmission equipped with a sub-transmission. In FIG. 8, the portions corresponding to those shown in FIG. 3 are designated by the same reference numbers as in FIG. 3. In this embodiment, the output signal of the comparator 26 for upshifting controls energization of an upshift indicator 40, and the output signal of the comparator 27 for downshifting controls the indicator 41. In this case, the indicator indicators 40 and 41 may include lamps which are lit to indicate the requirement for upshifting or downshifting when one or the other of the comparators is generating a "1" signal, and which are extinguished when one or the other of the comparators is generating a "0" signal.

In this embodiment, the changing over of the sub-transmission or the transmission may be done by the driver in accordance with the display of the upshift and downshift indicators 40 and 41.

Furthermore, in order to indicate that the engine is in the optimum operating condition, a NOR gate 42 and an OK indicator 43 may additionally be provided. The NOR gate receives the output signals of the comparators 26 and 27 and controls the OK indicator 43, so that, when both the comparators 26 and 27 are generating "0" signals, namely the transmission is shifted to a position suitable for the engine to operate in the optimum operating condition, the OK indicator 43 is lit.

Figure 9:
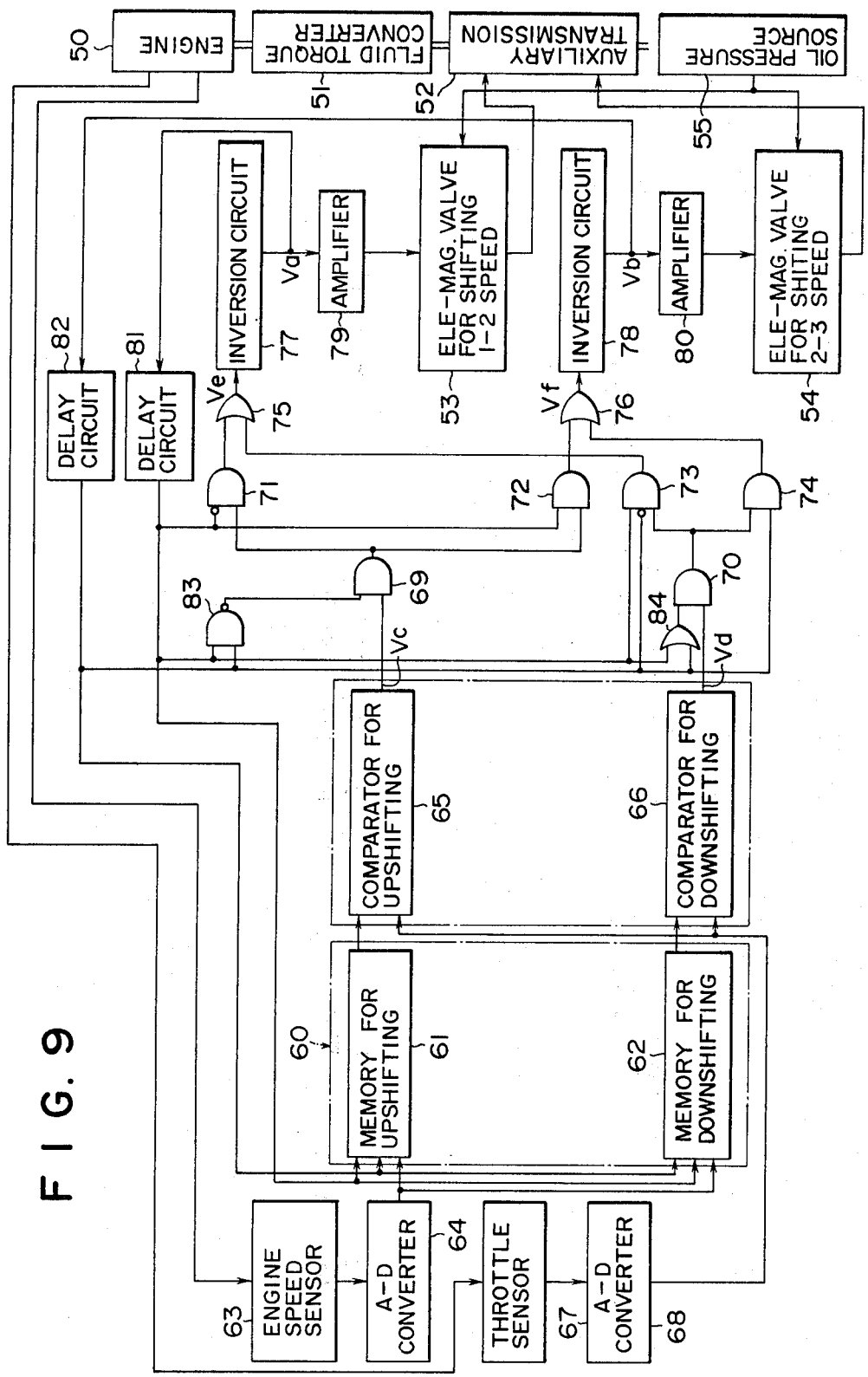
FIG. 9 is a diagrammatic view showing an embodiment of the present invention, which is adapted to perform automatically shift changing for an auxiliary transmission of an automatic transmission which includes a fluid torque converter.

FIG. 9 is a diagrammatic view showing still another embodiment of the transmission shift control device in accordance with the present invention, in which the present invention is applied to an automatic transmission having a fluid torque converter and an auxiliary transmission. In this diagram, the control system with regard to selection of shift positions done by a manual shift lever is omitted. In FIG. 9, 50 designates an engine, which provides rotary power through its crank shaft, a fluid torque converter 51, and an auxiliary transmission 52, to the axle of a vehicle, not shown in the drawing. In this embodiment, the auxiliary transmission 52 is adapted to provide three stages of transmission, selection between these stages being done by an electromagnetic valve 53, which changes over first and second speed stages, and an electromagnetic valve 54, which changes over second and third speed stages. Oil pressure is supplied from an oil pressure source 55 to the electromagnetic valves 53 and 54, each of which is adapted to open during its energization so as to supply the oil pressure to a servo mechanism, not shown, incorporated in the auxiliary transmission 52. In this case, the auxiliary transmission 52 is adapted so as to be in the first speed stage when both the electromagnetic valves 53 and 54 are closed, so as to be in the second speed stage when the electromagnetic valve 53 only is opened, and so as to be in the third speed stage when both the electromagnetic valves 53 and 54 are opened.

The transmission shift control device has a memory device 60, which includes a memory 61 for upshifting and a memory 62 for downshifting. The memory 61 for upshifting stores values of the lower limit of the target value Tlow for the optimum throttle opening corresponding to various engine speeds, and the memory 62 for downshifting stores values of the upper limit of the target value Thi for the optimum throttle opening corresponding to various engine speeds.

Figure 10:
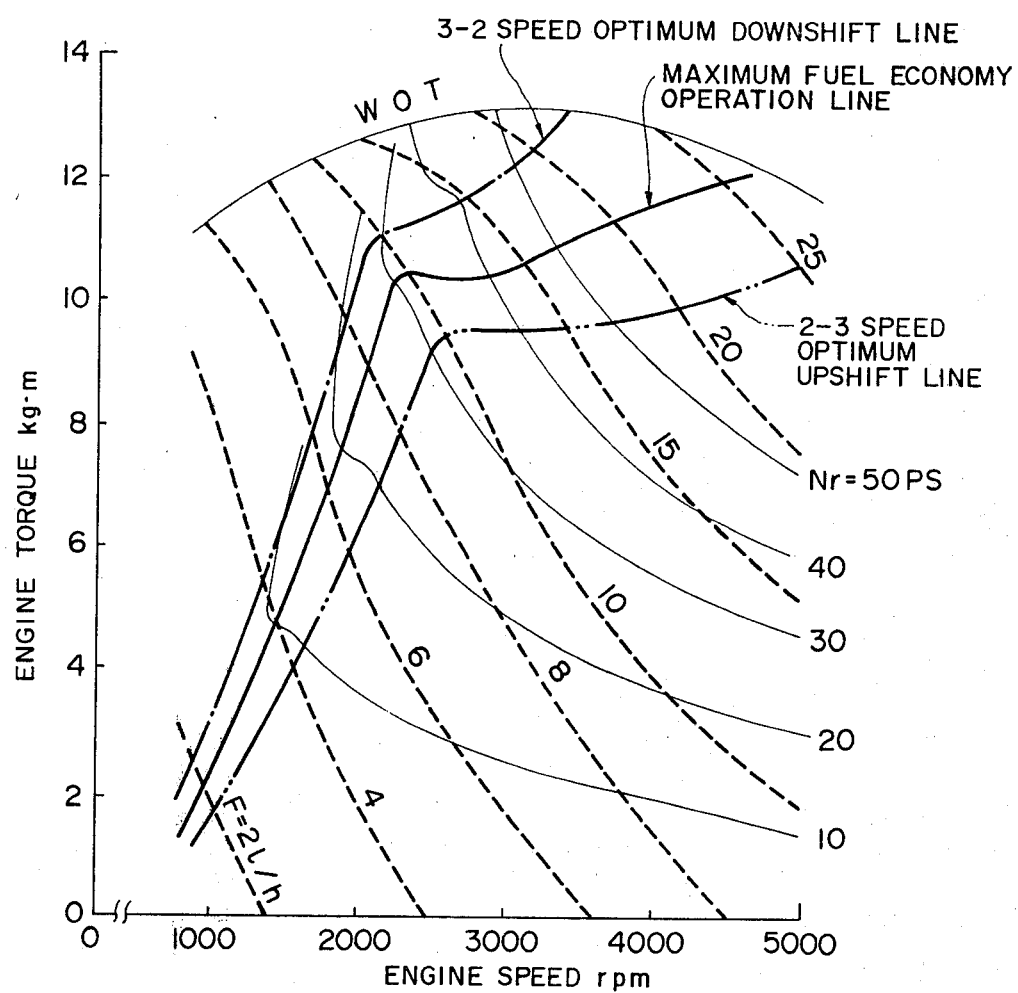
FIG. 10 is a graph showing a maximum fuel economy operating line, lines of equal required output power Nr, and so on, of a vehicle equipped with an automatic transmission including a fluid torque converter.

Herein, the optimum throttle opening which is stored in the memories 61 and 62 will be explained with reference to FIGS. 10 and 11. FIG. 10 is a graph, in which engine speed and engine torque are taken respectively along the abscissa and the ordinate, showing the maximum fuel economy operating line, equal Nr required output power lines, and so on, particularly with respect to operation in the second and third speed stages. In more detail, a thick solid line indicates the maximum fuel economy operating line, a two-dotted chain line indicates the optimum 2-3 upshift line (line of upshift from the second to the third speed stage), a one-dotted chain line indicates the optimum 3-2 downshift line (line of downshift from the third to the second speed stage), fine solid lines are lines of equal required power, and broken lines are lines of equal fuel consumption. The maximum fuel economy operating line is a line drawn by plotting points at which the fuel consumption F for obtaining various required output power levels Nr is the smallest, and the optimum 2-3 upshift line and the optimum 3-2 downshift line are drawn along and on opposite sides of the maximum fuel economy operating line. If the engine operates in the range defined by these optimum 2-3 upshift and 3-2 downshift lines, the engine exhibits the best fuel economy.

Figure 11:
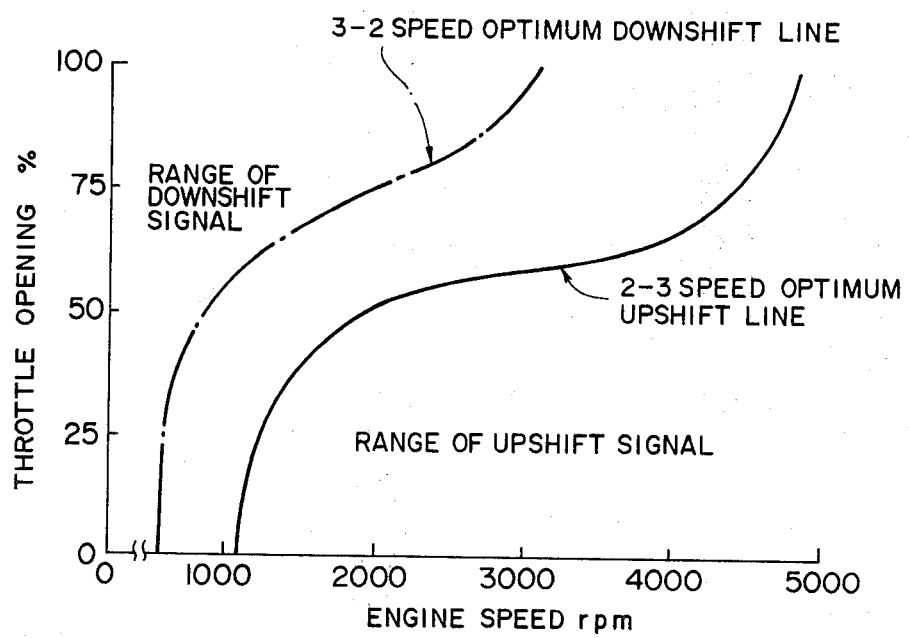
FIG. 11 is a graph showing an optimum upshift line and an optimum downshift line of a vehicle equipped with an automatic transmission including a fluid torque converter.

FIG. 11 is a graph, in which engine speed and throttle opening are taken respectively as the abscissa and the ordinate, showing the optimum 2-3 upshift line (the line of upshifting from second speed stage to third speed stage) and the optimum 3-2 downshift line (line of downshifting from third speed stage to second speed stage) for an automatic transmission including a fluid torque converter.

The memory 61 for upshifting is adapted to store the relation between the throttle opening and the engine speed along the optimum upshift line as shown in FIG. 11 with respect to various shift stages, and to give the value of the lower limit Tlow of the target value for the optimum throttle opening according to the engine speed. These memories 61 and 62 are adapted to receive the output signals of the belowmentioned first and second inversion circuits 77 and 78, which indicate the shift position, and an engine speed signal generated by an engine speed sensor 63 and converted to a digital signal by an A-D converter 64, and to give the values of the lower limit Tlow and the upper limit Thi of the target value of the throttle opening according to the shift position signal and the engine speed signal to the comparators 65 and 66 for upshifting and downshifting, respectively. These comparators also receive a throttle signal generated by a throttle sensor 67 and converted to a digital signal by an A/D converter 68. The comparator 65 is adapted to compare the actual value of the throttle signal, Treal, with the lower limit of the target value of the throttle opening, and generates a "1" signal when Treal is smaller than Tlow, while it generates a "0" signal when Treal is greater than Tlow. The comparator 66 is adapted to compare the actual value of the throttle signal, Treal, with the upper limit Thi of the target value of the throttle opening, and generates a "1" signal when Treal is greater than Thi, while generating a "0" signal when Treal is smaller than Thi.

The output signal of the comparator 65 is supplied to a first AND gate 69, and the output signal of the comparator 66 is supplied to a second AND gate 70. The output signal of the first AND gate 69 is supplied to a first INHIBIT gate 71 and a third AND gate 72. The output signal of the first INHIBIT gate 71 is supplied to a first OR gate 75, the output signal of which is supplied to a first inversion circuit 77. The output signal of the third AND gate 72 is supplied to a second OR gate 76, the output signal of which is supplied to a second inversion circuit 78. The first and second inversion circuits 77 and 78 may be of the same kind, as the inversion circuit 33 in the embodiment shown in FIG. 3. The output signal of the second AND gate 70 is supplied to a second INHIBIT gate 73 as well as to a fourth AND gate 74. The second INHIBIT gate 73 is a three-input type INHIBIT gate, the output signal of which is supplied to the first OR gate 75. The output signal of the fourth AND gate 74 is supplied to the second OR gate 76. The output signal of the first inversion circuit 77 is supplied to the electromagnetic valve 53 for changing over the first and second speed stages by way of an amplifier 79, and the output signal of the second inversion circuit 78 is introduced to the electromagnetic valve 54 for changing over the second and the third speed stages by way of an amplifier 80. Furthermore, the output signal of the first inversion circuit 77 is supplied to the negation input terminal of the first INHIBIT gate 71, the third AND gate 72, a NAND gate 83, the second INHIBIT gate 73, a third OR gate 84, the memory 61 for upshifting, and the memory 62 for downshifting, by way of a first delay circuit 81. The output signal of the second inversion circuit 78 is supplied to the NAND gate 83, the negative input terminal of the second INHIBIT gate 73, the third OR gate 84, the fourth AND gate 74, the memory 61 for upshifting, and the memory 62 for downshifting, by way of a second delay circuit 82. The output signal of the NAND gate 83 is supplied to the first AND gate 69, and the output signal of said third OR gate 84 is supplied to the second AND gate 70. According to an "0" or a "1" signal generated by the comparators 65 and 66, the logic circuit constituted as above does its logic decision in accordance with the following truth table:

|     | 1st. speed | 2nd. speed | 3rd. speed |
|-----|------------|------------|------------|
| Va: | 0 0 0      | 1 1 1      | 1 1 1      |
| Vb: | 0 0 0      | 0 0 0      | 1 1 1      |
| Vc: | 0 1 0      | 0 1 0      | 0 1 0      |
| Vd: | 0 0 1      | 0 0 1      | 0 0 1      |
| Ve: | 0 1 0      | 0 0 1      | 0 0 0      |
| Vf: | 0 0 0      | 0 1 0      | 0 0 1      |

In this table, Va is the output signal of the first inversion circuit 77, Vb is the output signal of the second inversion circuit 78, Vc is the output signal of the comparator for upshifting 65, Vd is the output signal of the comparator for downshifting 66, Ve is the output signal of the first OR gate 75, and Vf is the output signal of the second OR gate 76.

In operation of the vehicle, let it be assumed that the auxiliary transmission 32 is in the first speed stage, i.e. the first and second inversion circuits 77 and 78 are both generating "0" signals. At this time, according to the shift position of the auxiliary transmission 52 and the engine speed, the memory 61 for upshifting provides a value of the lower limit of the target value for the optimum throttle opening to the comparator 65 for upshifting, while the memory 62 for downshifting provides a value of the upper limit Thi of the target value for the optimum throttle opening to the comparator 66 for downshifting. If the real value of the throttle opening signal Treal, which is given from the throttle sensor 67 to the comparators 65 and 66, is smaller than the lower limit of the target value, the comparator 65 provides a "1" signal to the first AND gate 69. At this time, the other input terminal of said first AND gate 69 is receiving a "1" signal from the NAND gate 83, because this NAND gate is receiving "0" signals at both of its two input terminals. Therefore, the first AND gate 69 generates a "1" signal, which is supplied to the first INHIBIT gate 71 and the third AND gate 72. As the third AND gate 72 is receiving a "0" signal at its other input terminal, this AND gate remains in the state of generating a "0" signal. On the other hand, as the first INHIBIT gate 71 is receiving a "0" signal at its negation input terminal, this INHIBIT gate comes to generate a "1" signal, which is supplied to the first OR gate 75. Thus, the first OR gate 75 comes to generate a "1" signal, which is supplied to the first inversion circuit 77. When the first inversion circuit 77 receives a "1" signal, this inversion circuit 77 provides a "1" signal to the amplifier 79, whereby the electromagnetic valve for changing over the shift stage from the first speed stage to the second speed stage is energized. As a result, this valve is opened, so that the auxiliary transmission 52 is changed over from the first speed stage to the second speed stage. When the auxiliary transmission is shifted up, the engine speed lowers when compared with that before the shifting, corresponding to the decrease of the reduction ratio, thereby improving the fuel consumption. It should be understood that, when the second AND gate 70 receives a "1" signal from the comparator 66 at one input terminal thereof, while the auxiliary transmission 52 is in the first speed stage, the second AND gate 70 does not generate a "1" signal, because the other input terminal thereof is receiving a "0" signal.

Next, when the first AND gate 69 receives a "1" signal from the comparator 65 at one input terminal thereof, while the auxiliary transmission 52 is in the second speed stage, the first AND gate 69 again gives a "1" signal to the first INHIBIT gate 71 and the third AND gate 72, because the other input terminal of the first AND gate 69 is receiving a "1" signal from the NAND gate 83. At this time, as the negation input terminal of the first INHIBIT gate 71 is receiving a "1" signal, this first INHIBIT gate 71 does not generate a "1" signal. However, as the third AND gate 72 is receiving a "1" signal at the other input terminal thereof, this third AND gate 72 gives a "1" signal to the second OR gate 76. This second OR gate 76 gives a "1" signal to the second inversion circuit 78. When the second inversion circuit 78 receives a "1" signal, this second inversion circuit 78 generates a "1" signal, which is amplified by the amplifier 80 and then opens the electromagnetic valve 54 for changing over shift stage from the second speed stage to the third speed stage. As a result, the auxiliary transmission 52 is shifted up from the second speed stage to the third speed stage. On the other hand, when the second AND gate 70 receives a "1" signal from the comparator 66 for downshifting, while the auxiliary transmission 52 is in the second speed stage, the second AND gate 70 gives a "1" signal to one input terminal of the second INHIBIT gate 73 to one input terminal of the fourth AND gate 74, because the third OR gate 84 is receiving a "1" signal at one input terminal thereof. At this time, as the fourth AND gate 74 is receiving a "0" signal at the other input terminal thereof, this fourth AND gate 74 remains in the state of generating a "0" signal. However, as the second INHIBIT gate 73 is receiving a "1" signal at its other input terminal, and a "0" signal at its negation input terminal, this second INHIBIT gate 73 gives a "1" signal to the first OR gate 75. Thus, the first OR gate 75 gives a "1" signal to the first inversion circuit 77. When the first inversion circuit receives again a "1" signal, this first inversion circuit generates a "0" signal, whereby the electromagnetic valve 53 is closed and the auxiliary transmission 32 is shifted down from the second speed stage to the first speed stage.

When one input terminal of the second AND gate 70 receives a "1" signal from the comparator 66, while the auxiliary transmission 52 is in the third speed stage, the second AND gate 70 comes to give a "1" signal to one input terminal of the second INHIBIT gate 73 and to one input terminal of the fourth AND gate 74, because two input terminals of the third OR gate 84 are receiving a "1" signal. At this time, as the second INHIBIT gate 73 is receiving a "1" signal at its negation input terminal, this second INHIBIT gate does not generate any "1" signal. However, as the fourth AND gate 74 is receiving a "1" signal at its other input terminal, this fourth AND gate 74 gives a "1" signal to the second OR gate 76. Thus, this second OR gate 76 gives a "1" signal to the second inversion circuit 78. When the second inversion circuit 78 again receives a "1" signal, this second inversion circuit 78 generates a "0" signal, whereby the electromagnetic valve 54 for changing over the transmission between the second speed stage and the third speed stage is closed, and the auxiliary transmision 52 is shifted down from the third speed stage to the second speed stage. It should be understood that, when one input terminal of the first AND gate 69 receives a "1" signal from the comparator 65, while the auxiliary transmission is in the third speed stage, the first AND gate 69 does not generate any "1" signal, because the other input terminal thereof is receiving a "0" signal from the NAND gate 83, owing to the supply of a "1" signal at the two input terminals thereof.

By the shift change of the auxiliary transmission 52 according to the abovementioned manner, the engine comes to operate in the range limited by the optimum upshift line and the optimum downshift line as shown in FIG. 1, exhibiting very good fuel economy.

Figure 12:
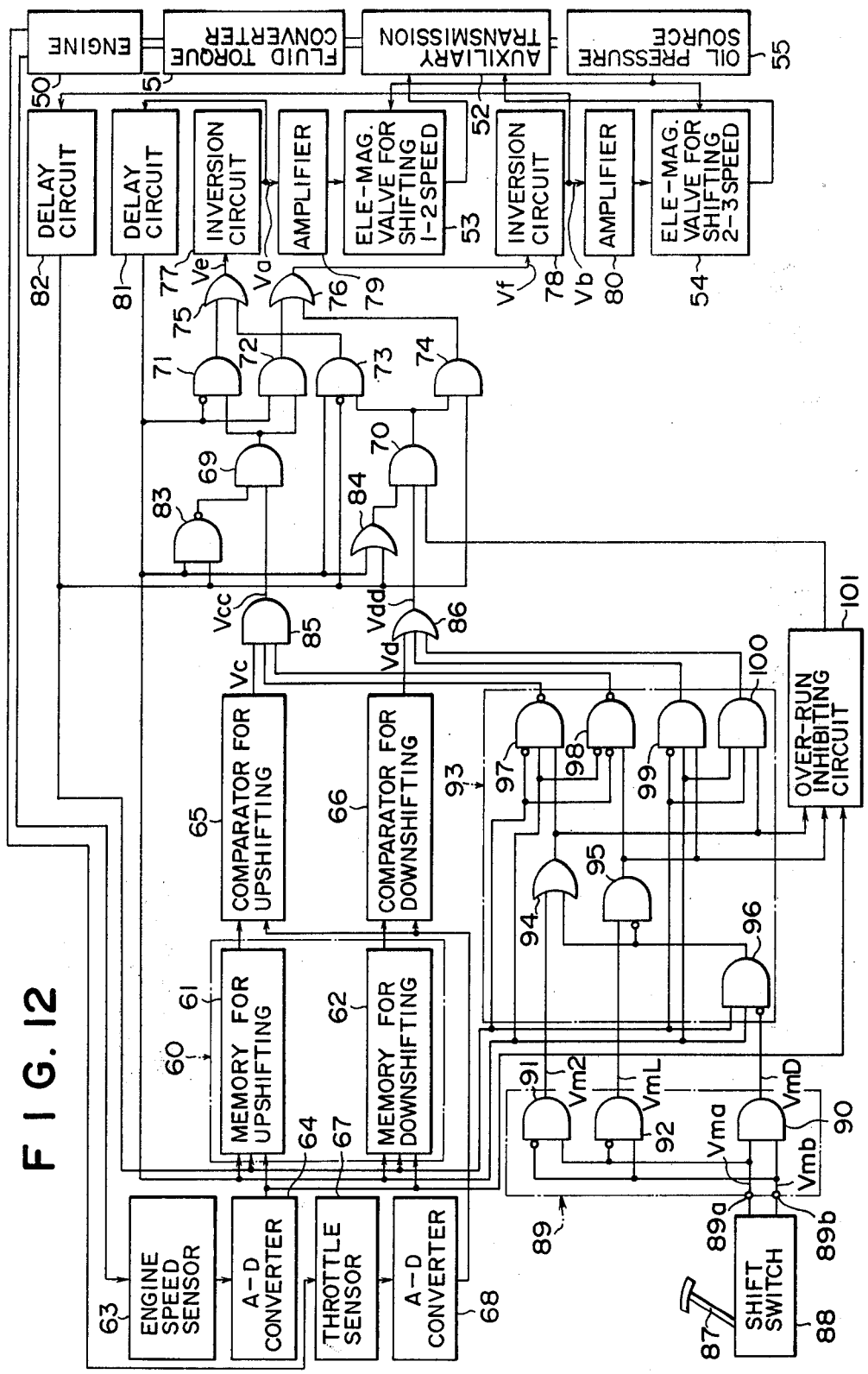
FIG. 12 is a diagrammatic view showing a more concrete embodiment, which is adapted to perform automatically the changeover of an auxiliary transmission of an automatic transmission by means of the transmission shift control device of the present invention.

FIG. 12 is a diagrammatic view, showing a more concrete embodiment, adapted to perform automatically changing over of the auxiliary transmission of the automatic transmission by means of the transmission shift control device of the present invention. In FIG. 12, the portions corresponding to those shown in FIG. 9 are designated by the same reference numerals as those in FIG. 9. In this embodiment, there is incorporated a control system related with the shift positions of a manual shift lever in the automatic transmission. The automatic transmission includes a manual shift lever 87, which is operated by hand by the driver. The manual shift lever 87 is adapted to be shifted between: N range, in which the auxiliary transmission 52 is set in the non-operating state; D range, in which the auxiliary transmission 52 is allowed to be changed over between various forward speed stages; 2 range, in which the auxiliary transmission 52 is prevented from being changed over to the highest speed stage, namely the third speed stage, and is allowed to be changed over only between the first speed stage and the second speed stage; 1 range, in which the auxiliary transmission 52 is fixed in the first speed stage; R range, in which the auxiliary transmission 52 is changed over to its backward driving stage; and P range, in which the auxiliary transmission is locked for parking. These shift positions are detected by a contact-type shift switch 88. The shift switch 88 is adapted to give a "0" signal to a first terminal 89a of a shift position sensor 89 and a "1" signal to a second terminal 89 of the sensor when the manual shift lever 87 is in L range, to give a "1" signal to the first terminal 89a and a "0" signal to the second terminal 89b when the manual shift lever 87 is in 2 range, and to give a "1" signal to both the first and the second terminals 89a and 89b when the manual shift lever 87 is in D range. The shift position sensor 89 includes one AND gate 90 and two INHIBIT gates 91 and 92. When the manual shift lever 87 is in L range, the INHIBIT gate 92 generates a "1" signal; when the manual shift lever 87 is in 2 range, the INHIBIT gate 91 generates a "1" signal; and when the manual shift lever 87 is in D range the AND gate 90 generates a "1" signal. The signals generated by these gates of the shift position sensor 89 are supplied to a logic circuit 93, which includes one OR gate 94, three INHIBIT gates 95, 96, and 99, two NAND gates 97 and 98, and one AND gate 100. This logic circuit 93 receives signals Va and Vb generated by the first and second inversion circuit 77 and 78 as signals indicating the real shift stage of the auxiliary transmission 52. Therefore, the NAND gate 97 generates a "0" signal only when the manual shift lever 87 is in 2 range and the auxiliary transmission 52 is in the second speed stage, while the other NAND gate 98 generates a "0" signal only when the manual shift lever 87 is in L range and the auxiliary transmission is in the first speed stage. The output signals of the NAND gates 97 and 98 are supplied to a fifth AND gate 85, which is connected between the comparator 65 for upshifting and the first AND gate 69. Therefore, the fifth AND gate 85 inhibits upshifting of the auxiliary transmission 52 when the manual shift lever 87 is in 2 range and the auxiliary transmission 52 is in the second speed stage, as well as when the manual shift lever 87 is in L range and the auxiliary transmission 52 is in the first speed stage. The AND gate 99 generates a "1" signal only when the manual shift lever 87 is in L range and the auxiliary transmission 52 is in the second speed stage, while the other AND gate 100 generates a "1" signal only when the manual shift lever 87 is in L range or 2 range and the auxiliary transmission 52 is in the third speed stage. The output signals of these two AND gates 99 and 100 are supplied to a fourth OR gate 86, which is connected between the comparator 66 for downshifting and the second AND gate 90. Therefore, the fourth OR gate 86 gives a downshift signal to the auxiliary transmission 52 when the manual shift lever 87 is in L range and the auxiliary transmission 52 is in the second speed stage or in the third speed stage, as well as when the manual shift lever 87 is in 2 range and the auxiliary transmission 32 is in third speed stage.

The circuit device shown in FIG. 12 does logical decisions in accordance with Table 1.

In this table, which is a truth table, Vma is the signal supplied to the first terminal 89a of the shift position sensor 89; Vmb is the signal supplied to the second terminal 89b of the sensor; VmD is the signal generated by the AND gate 90; Vm2 is the signal generated by the INHIBIT gate 92; Vcc is the output signal of the fifth AND gate 85; Vdd is the output signal of the fourth OR gate 86; and Va—Vf are the same signals as those in the embodiment shown in FIG. 9.

Furthermore, in this embodiment, an overrev inhibiting circuit 101 is provided, which inhibits downshifting of the auxiliary transmission 52 when the revolution speed of the engine 50 would exceed the rated speed, i.e. the engine would overrev, if the auxiliary transmission 52 were shifted down. This overrev inhibiting circuit 101 receives the engine speed signal generated by the engine speed sensor 63 and the output signals of the OR gate 94 and of the INHIBIT gate 95, and gives a "1" signal to the second AND gate 70 when the speed of the engine 50 will not exceed its rated speed even if the auxiliary transmission 52 is shifted down, while it gives a "0" signal to the AND gate 70 when the speed of the engine 50 will exceed its rated speed if the auxiliary transmission 52 is shifted down.

TABLE 1

| Signal | Position of manual shift lever | | | | | | | |
|---|---|---|---|---|---|---|---|---|
| | L-range | | | 2-range | | | D-range | |
| | Present shift stage | | | | | | | |
| | 1 | 2 | 3 | 1 | 2 | 3 | 1 | 2 | 3 |
| Vma | 0 0 | 0 0 0 | 0 0 | 1 1 | 1 1 1 | 1 1 | 1 1 | 1 1 1 | 1 1 |
| Vmb | 1 1 | 1 1 1 | 1 1 | 0 0 | 0 0 0 | 0 0 | 1 1 | 1 1 1 | 1 1 |
| VmD | 0 0 | 0 0 0 | 0 0 | 0 0 | 0 0 0 | 0 0 | 1 1 | 1 1 1 | 1 1 |
| Vm2 | 0 0 | 0 0 0 | 0 0 | 1 1 | 1 1 1 | 1 1 | 0 0 | 0 0 0 | 0 0 |
| VmL | 1 1 | 1 1 1 | 1 1 | 0 0 | 0 0 0 | 0 0 | 0 0 | 0 0 0 | 0 0 |
| Va | 0 0 | 1 1 1 | 1 1 | 0 0 | 1 1 1 | 1 1 | 0 0 | 1 1 1 | 1 1 |
| Vb | 0 0 | 0 0 0 | 1 1 | 0 0 | 0 0 0 | 1 1 | 0 0 | 0 0 0 | 1 1 |
| Vc | 0 1 | 0 1 0 | 0 0 | 0 1 | 0 1 0 | 0 0 | 0 1 | 0 1 0 | 0 0 |
| Vd | 0 0 | 0 0 1 | 0 1 | 0 0 | 0 0 1 | 0 1 | 0 0 | 0 0 1 | 0 1 |
| Vcc | 0 0 | 0 0 0 | 0 0 | 0 1 | 0 0 0 | 0 0 | 0 1 | 0 1 0 | 0 0 |
| Vdd | 0 0 | 1 1 1 | 1 1 | 0 0 | 0 0 1 | 1 1 | 0 0 | 0 0 1 | 0 1 |
| Ve | 0 0 | 0 0 0 | 0 0 | 0 0 | 0 0 0 | 0 0 | 0 0 | 0 1 0 | 1 0 |
| Vf | 0 0 | 0 0 0 | 1 1 | 0 1 | 1 1 0 | 1 1 | 0 1 | 1 1 0 | 1 1 |
| Shift stage after control | 1 1 | 1 1 1 | 2 2 | 1 2 | 2 2 1 | 2 2 | 1 2 | 2 3 1 | 3 2 |

Also in this embodiment, as in the embodiment shown in FIG. 9, the auxiliary transmission 52 is changed over according to the optimum upshift and downshift lines as shown in FIG. 11. However, upshift to the third speed stage is inhibited when the manual shift lever 87 is in 2 range, and upshift to the second speed stage and the third speed stage is inhibited when the manual shift lever 87 is in L range. If the auxiliary transmission 52 is in the third speed stage with the manual shift lever 87 being in 2 range, or if the auxiliary transmission 52 is in the second speed stage or in the third speed stage with the manual shift lever 87 being in L range, the auxiliary transmission 52 is shifted down to the second speed stage or the first speed stage, if overrevving of the engine 50 does not occur by the downshifting.

The case where the present invention is applied to an automatic transmission with a lockup clutch will also be explained. Since conditions for changing over the lock up clutch of an automatic transmission are determined by the engine speed and the throttle opening, changing over control of the lockup clutch is performed, in a manner analogous to the changing over control of the auxiliary transmission, by a control device including a memory, which stores the relation between the throttle opening and the engine speed, and gives the target values for one of them in accordance with the values of the other. In this case, the optimum upshift line and the optimum downshift line for the auxiliary transmission are different in accordance with whether the lockup clutch is on or off, and the upshift and the downshift lines in the on stage of the lockup clutch will be similar to those of the manual transmission.

FIG. 13 is a graph showing changeover lines for a lockup clutch, and the optimum upshift and downshift lines for an auxiliary transmission equipped with the lockup clutch. In this graph, the thick solid line "off-on" is the changeover line for changing over the lock up clutch from its off state to its on state; the thick broken line, "on-off", is the changeover line for changing over the lock up clutch from its on state to its off state; the fine solid line, "1-2, off" is the optimum upshift line for shifting up the transmission from the first speed stage to the second speed stage in the off stage of the lock up clutch; the fine broken line, "2-1, off", is the optimum downshift line for shifting down the transmission from the second speed stage to the first speed stage in the off stage of the lock up clutch; the thick one-dotted chain line, "2-3, off", is the optimum upshift line for shifting up the transmission from the second speed stage to the third speed stage in the off state of the lock up clutch; the thick two-dotted chain line, "3-2, off", is the optimum downshift line for shifting down the transmission from the third speed stage to the second speed stage in the off stage of the lock up clutch; the fine one-dotted chain line, "2-3, on", is the optimum upshift line for shifting up the transmission from the second speed stage to the third speed stage in the on state of the lock up clutch; and the fine two-dotted chain line, "3-2, on", is the optimum downshift line for shifting down the transmission from the third speed stage to the second speed stage in the on state of the lock up clutch. The lock up clutch of the automatic transmission, the performance of which is shown in this graph, is adapted to be changed over from the off state to the on state when the torque converter reaches a clutching-in point. Therefore, the "off-on" changeover line is a line which is obtained by plotting the clutching-in points of the torque converter, and the "on-off" changeover line is drawn beside the "off-on" changeover line at a certain distance therefrom. The optimum upshift line for shifting up the transmission from the first speed stage to the second speed stage exists exclusively in the range located on the left side of the "off-on" changeover line, as seen in the figure, and the optimum downshift line for shifting down the transmission from the second speed stage to the first speed stage also exists exclusively in the range on the left side of the "on-off" changeover line, as seen in the figure, and therefore the optimum upshift line and the optimum downshift line are provided only in operation with the lock up clutch disengaged.

Figure 14A:
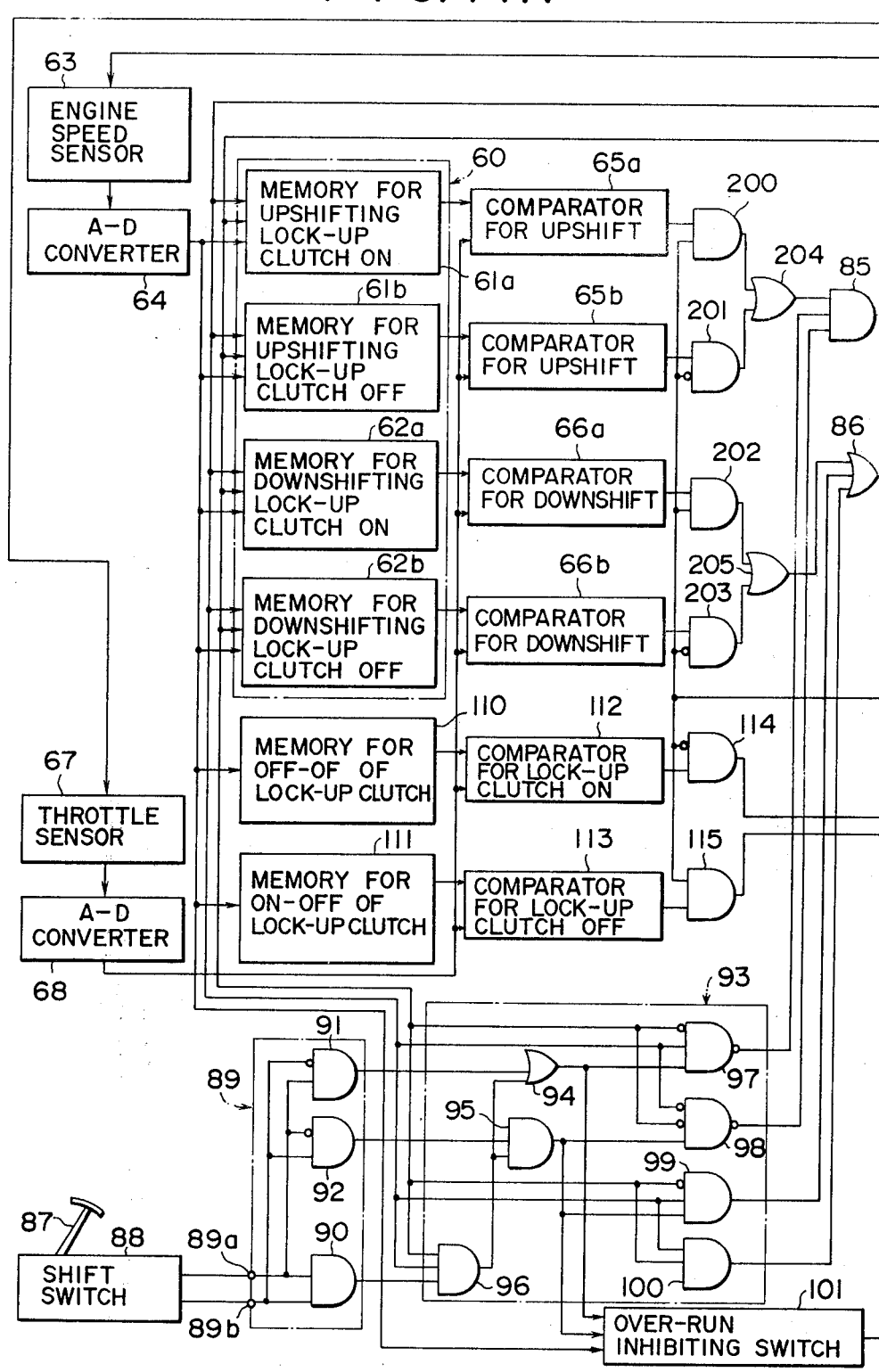
FIG. 14 is a diagrammatic view showing an embodiment of the present invention, which is adapted to perform automatically the changeover of an auxiliary transmission of an automatic transmission with directly coupled clutch.

FIG. 14 is a diagrammatic view showing still another embodiment of the present invention, which is adapted to perform automatically the changing over of an auxiliary transmission with a lock up clutch by the transmission shift control device of the present invention. In FIG. 14, the portions corresponding to those shown in FIG. 12 are designated by the same characters as in FIG. 12. In this embodiment, the automatic transmission includes a lock up clutch 56, which is actauted by oil pressure. This clutch 56 is put on when oil pressure is supplied to its pressure chamber, and is put off when oil pressure is not supplied to its pressure chamber. The supply of oil pressure to the pressure chamber is controlled by an electromagnetic valve 56, which thereby changes over the lock up clutch between its on and off states. This valve 57 is adapted to open when energized, so as to supply oil pressure from an oil pressure source 55 to the pressure chamber of the lock up clutch.

A memory 60 of the transmission shift control device includes a memory 61a for upshifting in the on state of the lock up clutch, a memory 61b for upshifting in the off state of the lock up clutch, a memory 62a for downshifting in the on state of the lock up clutch, and a memory 62b for downshifting in the off state of the lock up clutch. The memory 61a stores a relation between the throttle opening and the engine speed along the "2-3, on" optimum upshift line in FIG. 13, giving the lower limit of the target value for the throttle opening in accordance with the engine speed. The memory 61b stores a relation between the throttle opening and the engine speed along the "1-2, off" optimum upshift line and "2-3, off" optimum upshift line in FIG. 13, giving the lower limit of the target value for the throttle opening in accordance with the engine speed and the actual shifting stage at that time. The memory 62a stores a relation between the throttle opening and the engine speed along the "3-2, on" optimum downshift line in FIG. 13, giving the upper limit of the target value for the throttle opening in accordance with the engine speed. The memory 62b stores a relation between the throttle opening and the engine speed along the "2-1, off" optimum downshift line and "3-2, off" optimum downshift line in FIG. 13, giving the upper limit of the target value for the throttle opening in accordance with the engine speed and the actual shift stage at that time.

Furthermore, the transmission shift control device includes a memory 110 for changing over the lock up clutch from its off state to its on state, and a memory 111 for changing over the lock up clutch from its on state to its off state. The memory 110 stores a relation between the throttle opening and the engine speed along the "off-on" changeover line in FIG. 13, giving the target value of the throttle opening in accordance with the engine speed. The memory 111 stores a relation between the throttle opening and the engine speed as a relation along said "on-off" changeover line in FIG. 13, giving the target value of the throttle opening in accordance with the engine speed.

The memories 61a, 61b, 62a, 62b, 110, and 111 give the respective target values, which are selected in accordance with the engine speed signal generated by the engine speed sensor 63, to the comparators for upshifting 65a, 65b, the comparators for downshifting 66a, 66b, the comparator 112 for putting on the clutch, and the comparator 113 for putting off the clutch. Besides these target values, the comparators 112 and 113 receive the throttle signal generated by the throttle sensor 67. The comparator 112 for putting on the clutch is adapted to generate a "1" signal when the target value given by the memory 110 is greater than the throttle signal, while it generates a "0" signal when the target value is smaller than the throttle signal. The said comparator 113 for putting off the clutch is adapted to generate a "1" signal when the target value given by the memory 111 is smaller than the throttle signal, while it generates a "0" signal when the target value is greater than the throttle signal. The output signal of the comparator 112 for putting on the clutch is supplied to an input terminal of an INHIBIT gate 114, while the output signal of the comparator 113 for putting off the clutch is supplied to an input terminal of an AND gate 115. The output signals of the INHIBIT gate 114 and the AND gate 115 are supplied to an OR gate 116, the output signal of which is supplied to an inversion circuit 117 for changing over the lock up clutch. When the inversion circuit 117 receives a "1" signal at its input terminal, its output is inverted to "0" when it was "1", or to "1" when it was "0". This output signal is supplied to an electromagnetic valve 57 for changing over the lock up clutch between its on state and its off state, by way of an amplifier 118. I.e., in this case, the lock up clutch is put on when the output signal of the inversion circuit 117 is "1", while the lock up clutch is put off when the output signal is "0". By way of a delay circuit 119, the output signal of the inversion circuit 117 is supplied to the negation input terminal of the INHIBIT gate 114 and the other input terminal of the AND gate 115. Furthermore, the output signal of the inversion circuit 117, namely the signal indicating that the lock up clutch is in the on state or the off state, is supplied to two AND gates 200 and 202 and two INHIBIT gates 201 and 203. Therefore, when the lock up clutch 56 is in the on state, the output signal of the comparator 65a for upshifting is supplied to an OR gate 204 by way of the AND gate 200, and the output signal of the comparator 66a for downshifting is supplied to an OR gate 205 by way of the AND gate 202. On the other hand, when the lock up clutch 56 is in the off state, the output signal of the comparator 65b for upshifting is supplied to the OR gate 204 by way of the INHIBIT gate 201, and the output signal of the comparator 65b for downshifting 56b is supplied to the OR gate 205 by way of the INHIBIT gate 203. The output signal of the OR gate 24 is supplied to the AND gate 85, and the output signal of the OR gate 205 is supplied to the OR gate 86.

In this embodiment, the lock up clutch 56 is changed over according to the changeover lines as shown in FIG. 13, and the auxiliary transmission 52 is shifted according to the optimum upshift and downshift lines in accordance with on or off state of the lock up clutch.

Although the invention has been shown and described with respect to some preferred embodiments thereof, it should be understood that various changes and omissions of the form and the content of these embodiments can be made by one skilled in the art, without departing from the scope of the invention. Therefore it is desired that this scope should be determined not by any details of the embodiments described, or of the drawings, but solely by the appended claims.

We claim:

1. A transmission shift control device for control of transmission of a vehicle having an internal combustion engine with an intake system, said control comprising:
    throttle sensor means for generating an actual throttle signal representing the present throttle opening of the engine intake system;
    engine speed sensor means for generating an actual engine speed signal representing the present engine rotational speed;
    shift position sensor means for generating an actual shift position signal designating the present shift position of said transmission;
    upshifting memory means, which stores upshifting limits for various values of one of said throttle signal and said engine speed signal corresponding to various shift positions of said transmission, for providing one of said stored upshifting limits as an upshift limit signal in accordance with (1) the other of said throttle signal and said engine speed signal and (2) said shift position signal;
    downshifting memory means, which stores downshifting limits for various values of said one of said throttle signal and said engine speed signal corresponding to various shift positions of said transmission, for providing one of said stored downshifting values as a downshift limit signal in accordance with (1) said other of said throttle signal and said engine speed signal and (2) said shift position signal;
    first comparator means, which receives said upshift limit signal from said upshifting memory means and said one of said throttle signal and said engine speed signal for comparing these two received signals with each other, and for generating an upshift demand signal when said one of said throttle signal and engine speed signal is smaller than said upshift limit signal;
    second comparator means, which receives said downshift limit signal from said downshifting memory means and said one of said throttle signal and said engine speed signal, for comparing these two received signals with each other and for generating a downshift demand signal when said one of said throttle signal and said engine speed signal is larger than said downshift limit signal; and
    switching circuit means, which receives said upshift demand signal from said first comparator and said downshift demand signal from said second comparator, for determining shifting of said transmission in accordance with receipt of one of said upshift demand and downshift demand signals.

2. A transmission shift control device of claim 1, wherein said upshifting limits and said downshifting limits are determined so as to provide maximum fuel economy.

3. A transmission shift control device of claim 1, wherein said upshifting limits and said downshifting limits are determined so as to provide maximum fuel economy when the engine speed is lower than a predetermined value, and to provide the maximum output power when the engine speed is higher than a predetermined value.

4. A transmission shift control device of claim 1, wherein said upshifting limits and said downshifting limits are determined so as to provide the maximum fuel economy when the throttle opening is lower than a predetermined value, and to provide the maximum output power when the throttle opening is higher than a predetermined value.

5. A transmission shift control device of claim 1, wherein said upshifting memory means provides upshifting limits for said throttle signal as said upshift limit signal in accordance with inputs of said engine speed signal and said shift position signal.

6. A transmission shift control device of claim 1, wherein said upshifting memory means provides upshifting limits for said engine speed signal as said upshift limit signal in accordance with inputs of said throttle signal and said shift position signal.

7. A transmission shift control device of claim 1, wherein said downshifting memory means provides downshifting limits for said throttle signal as said downshift limit signal in accordance with inputs of said engine speed signal and said shift position signal.

8. A transmission shift control device of claim 1, wherein said downshifting memory means provides downshifting limits for said engine speed signal as said downshift limit signal in accordance with inputs of said throttle signal and said shift position signal.

9. A transmission shift control device of claim 1, further comprising an actuator, wherein said transmission is shifted by said actuator, said actuator being actuated by said switching circuit means.

10. A transmission shift control device of claim 1, further comprising indicators for upshifting and downshifting, wherein said switching circuit means controls operation of said indicators for upshifting and downshifting.

11. A transmission shift control device of claim 1, wherein said transmission includes a fluid torque converter and a lock-up clutch for selectively locking up said fluid torque converter, and wherein said upshifting memory means stores different values for said upshifting limits in accordance with the engagement and the disengagement of said lock-up clutch, and said downshifting memory means stores different values for said downshifting limits for engagement and disengagement of said lock-up clutch.

12. A transmission shift control device of claim 1, wherein said transmission includes a manual shift lever, and said shift position sensor comprises a shift switch for detecting the shift position of said manual shift lever and for generating output signals identifying said detected shift position, said output signals being supplied to said upshifting and downshifting means memory means and also to said switching circuit so as to partially limit automatic shifting of said transmission.

* * * * *